United States Patent [19]

Forker, Jr. et al.

[11] 3,839,054
[45] Oct. 1, 1974

[54] PREFORM CORE MATERIALS

[75] Inventors: Ray B. Forker, Jr., Horseheads;
Michael C. Carson; Randall C. Washington, both of Corning, all of N.Y.

[73] Assignee: Corning Glass Works, Corning, N.Y.

[22] Filed: Jan. 8, 1973

[21] Appl. No.: 321,737

[52] U.S. Cl. ............... 106/38.9, 106/38.8, 106/65, 106/69, 106/73.5, 264/56
[51] Int. Cl. ............................................. B28b 7/34
[58] Field of Search ............ 106/38.8, 38.9, 65, 68, 106/69, 73.5; 51/308, 309; 75/206; 264/56

[56] References Cited
UNITED STATES PATENTS
| | | | |
|---|---|---|---|
| 2,702,750 | 2/1955 | George | 106/58 |
| 3,223,540 | 12/1965 | Limes et al. | 106/65 |
| 3,295,934 | 1/1967 | Bre | 75/206 |

*Primary Examiner*—Lorenzo B. Hayes
*Attorney, Agent, or Firm*—Kees van der Steere; Clarence R. Patty, Jr.

[57] ABSTRACT

Preform core bodies consisting essentially of silica and alumina and comprising crystal phases of alpha cristobalite, mullite and alpha alumina which are sufficiently refractory and inert for casting with molten nickel and cobalt base superalloys at temperatures in excess of 1,500°C. are described. The core bodies are manufactured through controlled heat treatment of silica-alumina metal mixtures.

4 Claims, No Drawings

PREFORM CORE MATERIALS

BACKGROUND OF THE INVENTION

Preform cores comprise the interior molds employed in the manufacture of hollow metal castings such as, for example, jet engine blades and vanes. In order to be suitable for such applications, the preform core must exhibit certain chemical and physical attributes. First, it must possess adequate strength (modulus of rupture on the order of about 2,000 psi) to withstand wax injection and other handling procedures. Secondly, it must demonstrate sufficient refractoriness to withstand contact with molten metal at temperatures in excess of 1,500°C. Thirdly, it must be chemically inert to molten superalloys so as to permit the casting of bodies free from defects. Fourthly, it must be readily removable from the casting through leaching with non-acidic solutions, since acidic materials commonly attack the alloys used for such castings. Finally, it should have a coefficient of thermal expansion below about $60 \times 10^{-7}$/°C. to assure physical compatibility with the outer mold material and the cobalt and/or nickel superalloy casting.

For many years, the most widely used core material for metal castings has been sand, i.e., silica. However, as metals and metal alloys were developed which required higher and higher melting temperatures, the useful working temperatures of silica cores were exceeded and reactivity of the cores with the molten metal alloys became a problem. In attempting to improve the properties of preform cores, various refractory materials, e.g., zircon and alumina, were blended with silica in an effort to raise the working temperature thereof; however, the resulting cores were mechanically weak, and were thus subject to breakage in the course of wax injection and handling, as well as to physical disintegration due to thermal stresses. Furthermore, the added refractory materials frequently demonstrated reaction with the molten metals at the extreme elevated temperatures demanded for casting.

It is the principal object of the present invention to provide preform cores which not only posses the inherent strength to resist mechanical breakage and the necessary refractoriness to avoid sagging and physical disintegration, but which also will be chemically inert to molten metals at the extreme temperatures required for their casting and readily leachable by non-acid materials.

SUMMARY OF THE INVENTION

The present invention is based on the discovery that a preform core material of excellent strength, refractoriness and chemical inertness may be prepared by firing a body consisting essentially of specified proportions of aluminum metal and silica according to a specifically defined heat treatment schedule. It is, of course, well known in the prior art that contact between molten aluminum metal and silica at elevated temperatures produces a cermet material comprising an aluminum-silicon alloy according to the reaction: $SiO_2 + Al \rightarrow AlSi_n + AlO_x$. Thus, U.S. Pat. No. 2,702,250 describes the production of articles consisting of this alloy and alumina according to a process comprising contacting a silica with molten aluminum at temperature in the range from about 700°–900°C.

We have now discovered that controlled heating of a composition consisting essentially, in weight percent, of about 2–20% aluminum metal and 80–98% silica or other specified highly siliceous materials under conditions at least sufficient to react essentially all of the aluminum metal in the composition with silica to form an aluminum-free product comprising silica and alumina according to the reaction: $Al + SiO_2$ (excess) $\rightarrow Al_2O_3 + Si + SiO_2$ produces a ceramic material which demonstrates adequate strength, refractoriness, inertness and leachability for use as a preform core material. This result cannot be duplicated by firing a body wherein alumina rather than aluminum metal is a principal constituent.

Broadly, the method of manufacturing a preform core according to the present invention comprises compounding a batch consisting essentially, in weight percent, of about 2–20% of finely-divided aluminum metal and 80–98% of finely-divided silica or an equivalent thereof, shaping the batch into a preform core body of the desired configuration, and firing the shaped body according to a procedure which comprises heating at a temperature in the range from about 500°–1,200°C. for a period of time sufficient to react essentially all of the aluminum preset in the body with silica to form aluminum oxide and silicon, that time usually ranging between about 1–12 hours depending upon the firing temperature employed, cooling the body at least to a temperature at which alpha cristobalite will form therein, that temperature being in the vicinity of about 275°C., and finally flash-firing the body at least once at a temperature in the range from about 1,000°–1,650°C. for a time in the range from about ¼–12 hours to promote the oxidation of the silicon remaining in the body to silicon dioxide and to encourage the development of mullite as well as alpha cristobalite and alpha alumina crystal phases therein.

The product of the process as above described is a preform core body which consists essentially, in weight percent as calculated from the batch, of about 50–96% $SiO_2$, 4–37% $Al_2O_3$, and not more than about 15% silicon metal, and which comprises crystalline phases of alpha cristobalite, alpha alumina, and mullite. The body is refractory, inert, leachable, and strong enough to withstand handling, wax impregnation, casting and other mechanical stresses to which preform cores are commonly subjected.

DESCRIPTION OF THE PREFERRED EMBODIMENTS

The manufacture of preform cores having the most desirable qualities for commercial use requires careful control of at least five interrelated properties: strength, shrinkage, leachability, chemical inertness and refractoriness. Shrinkage must be controlled during the manufacture of preform core bodies in order to meet the close dimensional tolerances imposed by the users of these cores. Therefore, we prefer that shrinkage during firing be maintained below 5% and desirably below 2% by volume if the required dimensional tolerances are to be met. Carefully controlled firing treatments are employed to keep shrinkage below the preferred 2% level, as will hereinafter more fully appear.

The strength of preform cores in these systems is complicated function of composition and firing treatment. In general, the employment of minor amounts of additions to improve the strength of the cores results in unacceptable losses in refractoriness and/or leachability which are not outweighed by the strength improvements obtained. However, the addition of moderate amounts of high-silica borosilicate glasses such as the 96% silica glasses produces useful strength increases without significant losses in leachability and refractoriness. Thus, in addition to fused quartz or fused silica which constitute preferred sources of $SiO_2$ in the preform core batches of the present invention, we may include, in partial substitution for pure silica, a 96% silica glass in an amount ranging up to about 40% by weight of the batch. Such additions result in the modification of the oxide composition of the preform core to include, in partial substitution for silica, up to about 1.5% $B_2O_3$ and, preferably, only trace amounts of alkali. While slightly reducing refractoriness, these additions appear to improve the strength of the preform core material.

The most critical aspect of the manufacture of preform cores according to the present invention is the firing treatment employed in converting the green aluminum-and-silica-containing cores to silica-alumina cores of the required composition and structure. The firing treatment employed affects principally the strength of the product, but also to a certain extent the shrinkage of the core during firing and the refractoriness, porosity, and leachability of the fired material. The strong dependence of observed final properties on firing treatment in these systems is not completely understood, but is believed largely attributable to the marked effect of firing variations on crystal phase configuration and distribution in the final material.

Whereas initial heating of the green core body to convert the aluminum-silica body to an alumina-silicon-silica body does not appear to be extremely sensitive to variations in temperature, so that heating at temperatures in the range of about 500°–1,200°C. for times in the range of about 1–12 hours appear to produce the desired result, economy as well as optimization of physical properties dictate a preferred initial heating step which comprises heating at temperatures in the range of about 700°–900°C. for about 2–8 hours. Higher temperatures are not preferred because they appear to increase the extent of cristobalite formation during firing, and upon cooling produce a weaker product. Also, at this stage of treatment the core still comprises large amounts of glass, and deformation may result if excessive temperatures are employed. Heating rates to the above temperatures not exceeding about 350°C. per hour are preferred to minimize thermal stresses in the green core and to permit the escape of volatile species such as binder decomposition reaction by-products and the like.

Following heating to promote reaction between the aluminum and silica present in the green core body, the reacted body must be cooled, preferably below about 275°C., prior to initiating flash-firing procedures. Failure to adequately cool the body prior to flash-firing produces excessive shrinkage and distortion during later flash-firing as the temperature employed to initially react the core constituents are exceeded. Our preferred practice comprises gradual cooling of the cores to minimize both thermal stresses and inversion stresses in the cristobalite phase which occur as beta-cristobalite inverts to alpha-cristobalite on cooling. Thus, we prefer to allow the fired cores to cool in the furnace at the furnace rate of about 25°C. per hour to at least below the cristobalite inversion temperature of about 275°C.

The firing of an aluminum metal-silica core as above described produces a body comprising silica, alumina, and silicon metal which must be further treated in order to obtain a core with useful properties. We have found that the required combination of strength, leachability and refractoriness can be obtained in these systems only through the use of a further flash-firing technique wherein the core is very rapidly heated to the selected firing temperature as, for example, by placing in a ceramic furnace which is already at the prescribed temperature. Slow or moderate heating of cores which have been preliminarily heated to obtain an alumina-silica-silicon body as above described accelerates the growth of cristobalite and produces a body of insufficient strength for preform core applications. Flash-firing treatments, on the other hand, appear to retard the growth of cristobalite while at the same time oxidizing much of the silicon present in the body to $SiO_2$ and promoting the growth of a mullite ($3Al_2O_3 \cdot 2SiO_2$) crystal phase which improves the strength of the finished product. In addition, the flash-firing procedure appears to minimize shrinkage of the core material.

Suitable flash-firing procedures for the purposes of the present invention may comprise either single or multiple exposures to temperatures in the 1,000°–1,650°C. temperature range for times ranging from about ¼–12 hours as hereinabove described. In general, longer times are employed with lower temperature treatments and vice versa in order to obtain the best combination of final properties. Also, multiple exposures are typically undertaken in order of increasing temperature to provide greater control over the changes occurring in the structure of the core during firing.

By far the best combination of properties in the finished core is obtained through the use of flash-firing procedure which includes a final exposure of the core to temperatures near the projected use temperature of the material, e.g., temperature in the range of about 1,500°–1,650°C. At these temperatures, treatments of ¼–¾ hour duration are sufficient to optimize strength and refractoriness in the core material, whereas longer treatments increase the cristobalite content and markedly decrease the strength of the fired core. Temperatures in the 1,550°–1,650°C. range are preferred with the more refractory $B_2O_3$-free compositions, whereas 1,500°–1,550°C. treatments are used with less refractory compositions containing $B_2O_3$ in order to avoid deformation and/or excessive sintering.

In many instances, particularly where the core has been initially fired at temperatures below about 1,000°C., the use of an intermediate-temperature flash-firing treatment (prior to the final flash-firing at the projected use temperature of the material) is effective to reduce shrinkage and to further increase the refractoriness and leachability of the core. Such intermediate treatments preferably comprise heating at temperatures in the range from about 1,000°–1,500°C. for time periods ranging about 2–4 hours, although temperatures not exceeding about 1,300°C. are preferred with the less refractory $B_2O_3$-containing core compositions. Significantly longer treatments, viz., up to about 12 hours or even substantially longer, may be employed at these temperatures but do not appear to improve the properties of the core. Again, flash-firing rather than slow heating is required with these intermediate treatments to retard cristobalite growth during the process.

Intermediate flash-firing treatments at temperatures below those employed in the initial firing of the alumina-silica body do not appear to produce substantial improvements in core properties.

Our particularly preferred practice involves the use of a two-step flash-firing procedure comprising an intermediate flash-firing step at temperatures in the range of about 1,000°–1,300°C. for 2–4 hours, followed by cooling and then a final flash-firing step at temperatures in the range of about 1,500°–1,650°C. for ¼–¾ hours. This practice permits an increase in the crystallinity of the body during the intermediate flash-firing step and thus helps to prevent deformation of the body which might occur if it were flash-fired to 1,500°C. while still containing significant quantities of glass and silicon metal.

Composition also has an important effect on the properties of preform core bodies produced according to the present invention. The incorporation of aluminum metal into the batch is required to obtain the desired strength and refractoriness in the finished product. However, excessive aluminum additions result in the presence of an excessive amount of mullite in the fired material which adversely affects the leaching properties of the core. Thus, as batch addition of aluminum metal approach 20% by weight, the effect of mullite in the core on leachability increasingly severe. We have found that batch additions of aluminum metal ranging about 5–15% by weight produce cores having the best refractoriness, strength and leachability. Such cores consist essentially, in weight percent as calculated from the batch, of about 61–71% $SiO_2$, 9–28% $Al_2O_3$, not more than about 11% silicon, and, optionally, up to about 1.5% $B_2O_3$ in partial substitution for silica where major additions of 96% silica glass are employed.

The effects of silicon metal on the observed final properties of cores produced according to the present invention are not completely understood; however, it is presently believed that the presence of silicon is not essential and that excessive amounts of unreacted silicon can decrease refractoriness and deleteriously affect the chemical inertness of the core material. For this reason, the oxidation of the silicon phase during firing is deemed desirable and the best cores in the preferred range of compositions are found to have considerably less silicon present after firing than would be present in the absence of such oxidation. Hence, cores containing not less than about 68% silica and not more than about 6% silicon metal after flash-firing are particularly preferred.

Other important properties demonstrated by preform core bodies produced according to the present invention include substantial porosity and a small degree of flexibility. Porosity is important in determining the leachability of the core material, and the relatively high porosity of the preform core materials of the present invention (typically about 30–40% by volume) is believed to be a major factor contributing to the excellent leaching properties of these cores. In addition, our cores appear to be somewhat more flexible than prior art materials, a property which increases the resistance of the material to breakage. Thus, whereas a modulus of rupture strength of about 1,000°–1,500 psi is normally desired to enable brittle commercial cores to withstand the stresses of handling and usage, our cores have been found to resist these stresses even where demonstrating somewhat lower modulus of rupture strengths.

The shaping of the specified batch materials into a preform core body of the desired configuration suitable for firing as hereinbefore described conveniently comprises mixing the batch materials in comminuted form with a liquid vehicle and thereafter shaping the wetted batch into a body of the desired configuration by pressing, injection molding, extruding, slip-casting, rolling or the like. A particularly preferred method for shaping the batch is described in U.S. Pat. No. 3,330,892. Briefly, this preferred molding practice comprises dispersing the specified batch ingredients in a fluid organic vehicle together with an organic deflocculant and a binder, molding the fluid batch mixture into the configuration of a core, and hardening the shaped mixture into a relatively rigid green body. Thereafter, the the green body is heated to remove the organic vehicle and fired to obtain the desired reaction and sintering. The unique and desirable feature of this preferred practice is that an organic vehicle is selected which is solid at room temperature but fluid at moderately elevated temperatures, e.g., below 200°C., and which has a vapor pressure of at least 1 mm. Hg at it's melting point under ambient conditions. The batch constituents and vehicle are heated sufficiently to bring the vehicle to suitable fluidity to impart the necessary moldable consistency to the batch mixture for the desired molding technique, and then the fluid mixture is molded and cooled below the melting point of the vehicle to rigidify the molded body. Thereafter, the body is heated to an elevated temperature below the melting point of the vehicle to cause the rapid sublimation of the vehicle from the body.

The degree of comminution and the particle size distribution of the silica, aluminum, and/or other inorganic batch materials are those normally employed in the making of preform cores. In general, the maximum particle size will not exceed about 100 Tyler mesh (about 149 microns) and, preferably, will be finer than about 325 Tyler mesh (144 microns). However, the operability of this invention is not tied to any particular particle size range, the only requirement being that the size and distribution are such as to yield a coherent sintered structure.

A further understanding of the details relating to the practice of the above-described forming method may be obtained through a study of U.S. Pat. No. 3,330,892, and that patent is expressly incorporated herein by reference for a complete explanation of the principles and procedures involved.

The present invention may be further understood by reference to the following detailed examples which, while representative of the best mode contemplated for carrying out the invention, are merely illustrative of the numerous variations and modifications which may obviously be employed within the scope of the invention as defined by the appended claims. Thus, inasmuch as the preferred method for forming the preform cores of the invention utilizes the practice set forth in U.S. Pat. No. 3,330,892, because of the complexity of shape required in the manufacture of hollow metal castings for jet engine blades and vanes using these cores, the working examples set out below utilize that practice although it will be understood that equivalent forming methods known in the art could also be employed.

In each of the following examples, the organic vehicle employed is paradichlorobenzene, the organic deflocculant is fish oil, and the organic binder is Carbowax[R] 20M, a water-soluble, waxy, solid polyethylene glycol having an average molecular weight of about 20,000 and being insoluble in paradichlorobenzene. The batches are formed by heating first the vehicle and then the deflocculant and the binder in a mixer to about 180°–190°F., adding the dry batch ingredients, and mixing for about one-half hour. The dry batch ingredients, typically including pure fused silica, aluminum powder and 96% silica glass, are tumble-mixed for about two hours prior to use to insure thorough mixing and fine particle size. After blending with the vehicle, binder and deflocculant, the mixed batch is pressed into preform core shapes and these shapes are placed in a drying oven at 100°F. until substantially all of the paradichlorobenzene has sublimed out of the material. The green cores are then fired according to the selected heat treatment to form the finished product.

EXAMPLE I

Batch Composition

| | Density (g/cc.) | Weight (g.) | Volume (cc) | Weight % | Volume % |
|---|---|---|---|---|---|
| Fused Silica | 2.2 | 1026 | 467.2 | 68.7 | 59.9 |
| Powdered Aluminum | 2.7 | 115 | 42.6 | 7.7 | 5.5 |
| Vehicle | 1.46 | 228 | 156.2 | 15.2 | 20.0 |
| Deflocculant | 0.92 | 34.0 | 37.0 | 2.3 | 4.7 |
| Binder | 1.20 | 91.5 | 76.2 | 6.1 | 9.8 |

Green cores prepared from the above composition are heated in an electric furnace at a rate of about 350°C. per hour to a temperature of about 800°C., held at 800°C. for 2 hours, cooled at the furnace rate (about 25°C. per hour) to about 250°C., and then removed from the furnace and cooled to room temperature. The fired cores are then flash-fired by plunging into an electric furnace operating at 1,300°C. for 2 hours, removed from the furnace, and cooled to room temperature. Usually the cores are covered to prevent over-rapid cooling. Finally, the cores are again flash-fired by placement in a furnace operating at 1,650°C. for one-half hour, and then removed and cooled to room temperature while covered.

X-ray examination of the fired core material shows a major crystal phase of alpha-cristobalite and minor phases of alpha-alumina, mullite and silicon. Typical modulus of rupture values determined on these cores are about 1,760 psi, with shrinkage on firing of about 1.2% by volume being observed.

The refractoriness and inertness of the cores is tested by contact with molten cobalt-based superalloy during casting at 1,500°C. This alloy is quite reactive, being characterized by a coefficient of thermal expansion of about $181.6 \times 10^{-7}$/°C. and having the approximate composition, in weight percent:

| | |
|---|---|
| Cr | 21.3 |
| Ni | 10.0 |
| W | 6.8 |
| Ta | 3.5 |
| C | 0.55 |
| Zr | 0.48 |
| Ti | 0.19 |
| Co | 57.5 |

No evidence of temperature failure after pouring at 1,500°C. is observed, now does any significant reaction between the core and the molten alloy occur to deleteriously affect the quality of the casting.

The cores produced as described also show excellent leaching characteristics, with about 72% volume dissolution of the core material being accomplished by a 30-minute immersion in a boiling KOH solution containing 45% KOH by weight.

EXAMPLE II

A batch composition substantially identical to the composition described in Example I is formed into cores and fired according to a schedule comprising heating at a rate of about 350°C. per hour to 800°C., holding at 800°C. for 2 hours, cooling at furnace rate to about 250°C., and then removing from the furnace and cooling to room temperature. Thereafter, the cores are flash-fired by plunging into a furnace operating at 1,000°C., soaking for 2 hours, and removing and cooling to room temperature. Finally, they are again flash-fired by plunging into a furnace operating at 1,650°C., soaking for one-half hour, and removing and cooling to room temperature.

Cores produced as described show a phase distribution quite similar to the cores described in Example I, a modulus of rupture strength of about 1,220 psi, and a shrinkage of about 0.66% by volume on firing. They are substantially inert to molten nickel- and cobalt-base superalloys when used in casting at 1,500°C. as described in Example I, and demonstrate 86% volume dissolution after a 30-minute immersion in boiling 45% KOH solution.

EXAMPLE III

A batch composition substantially identical to the composition described in Example I is formed into cores and fired according to a schedule comprising heating at a rate of about 350°C. per hour to 800°C., holding at 800°C. for 2 hours, cooling to 250°C. at furnace rate, and then removing from the furnace and cooling to room temperature. Thereafter, the cores are flash-fired by plunging into a furnace operating at 1,500°C., soaking for 2 hours, and removing and cooling to room temperature. Finally, they are again flash-fired by plunging into a furnace operating at 1,650°C., soaking for one-half hour, and removing and cooling to room temperature.

Cores produced as described show a phase distribution quite similar to the cores described in Example I, a modulus of rupture strength of about 1,310 psi, and an expansion on firing of about 0.15% by volume. They are substantially inert to molten nickel- and cobalt-based superalloys when used in casting at 1,500°C. as described in Example I, and demonstrate 95% volume dissolution after a 30-minute immersion in boiling 45% KOH solution.

EXAMPLE IV

Batch Composition

| | Density (g/cc.) | Weight (g.) | Volume (cc) | Weight % | Volume % |
|---|---|---|---|---|---|
| Fused Silica 96% | 2.2 | 571 | 259.5 | 38.2 | 33.3 |
| Silica Glass Powdered | 2.2 | 457 | 207.7 | 30.5 | 26.6 |

Batch Composition-Continued

|  | Density (g/cc.) | Weight (g.) | Volume (cc) | Weight % | Volume % |
|---|---|---|---|---|---|
| Aluminum | 2.7 | 115 | 42.6 | 7.7 | 5.5 |
| Vehicle | 1.46 | 228 | 156.2 | 15.2 | 20.0 |
| Deflocculant | 0.92 | 34.0 | 37.0 | 2.3 | 4.7 |
| Binder | 1.20 | 91.5 | 76.2 | 6.1 | 9.8 |

Green cores prepared from the above composition are fired according to a schedule comprising heating at a rate of about 350°C. to 800°C., holding at 800°C. for 2 hours, cooling to about 250°C. at furnace rate, and then removing from the furnace and cooling to room temperature. Thereafter, the cores are flash-fired by plunging into a furnace operating at 1,000°C., soaking for 2 hours, and removing and cooling to room temperature. Finally, they are again flash-fired by plunging into a furnace operating at 1,500°C., soaking for one-half hour, and removing and cooling to room temperature.

Cores produced as described typically consist essentially, in weight percent, of about 78% $SiO_2$, 18% $Al_2O_3$, 1.2% $B_2O_3$, and 3.1% Si, and have a phase distribution quite similar to that of the cores described in Example I. Modulus of rupture strengths are about 1,940 psi, and shrinkage on firing is about 1.38% by volume. These cores are substantially inert to cobalt-based superalloys when used in casting at 1,500°C. as described in Example I, and demonstrate essentially 100% volume dissolution after a one-hour immersion in boiling 45% KOH solution.

EXAMPLE V

A batch composition substantially identical to the composition described in Example IV is formed into cores and fired according to a schedule comprising heating at a rate of about 350°C. per hour to 800°C., holding at 800°C. for 2 hours, cooling at furnace rate to about 250°C., and then removing from the furnace and cooling to room temperature. Finally, the cores are flash-fired by plunging into a furnace operating at 1,500°C., soaking for one-quarter hour, and removing and cooling to room temperature.

Cores produced as described show a phase distribution quite similar to the cores described in Example IV, a modulus of rupture strength of about 3,600 psi, and a shrinkage of about 1.85 by volume on firing. They are substantially inert to molten cobalt-based superalloys when used in casting as described in Example I, and demonstrate 82% volume dissolution after a 15-minute immersion in boiling 45% KOH solution.

We claim:

1. A preform core body capable of withstanding contact with molten nickel and cobalt base superalloys at temperatures in excess of 1,500°C. formed by firing a green core body composed of about 2–20% of aluminum metal and 80–98% of silica by weight to a temperature in the range of about 500°–1,200°C. for a period of time sufficient to react essentially all of the aluminum metal present in the body with silica to form aluminum oxide and silicon metal, cooling the body at least to a temperature at which alpha cristobalite will form therein, and flash-firing the body at least once at a temperature in the range of about 1,000°–1,650°C. for a time in the range of about ¼–12 hours, said preform core body being composed of about 50–96% $SiO_2$, 4–37% $Al_2O_3$, and not more than 15% silicon metal by weight, and said $SiO_2$ and $Al_2O_3$ being present in said preform core body in the form of alpha cristobalite, alpha alumina and mullite crystalline phases.

2. A preform core body according to claim 1 wherein the green core body is composed of about 5–15% aluminum metal and 85–95% silica by weight and the preform core body is composed of about 61–71% $SiO_2$, 9–28% $Al_2O_3$, and not more than 11% silicon metal by weight.

3. A preform core body according to claim 2 which contains not less than about 68% $SiO_2$ and not more than about 6% silicon metal by weight.

4. A preform core body according to claim 2 wherein the green core body contains, in partial substitution for silica, a 96% silica glass in an amount ranging up to about 40% by weight of said green core body, and wherein the preform core body contains up to about 1.5% $B_2O_3$ by weight.

* * * * *